Feb. 7, 1956     J. M. DAUBENSPECK     2,733,983
METHOD OF RECOVERING NICKEL AND
COBALT FROM NICKELIFEROUS ORES
Filed Dec. 7, 1953
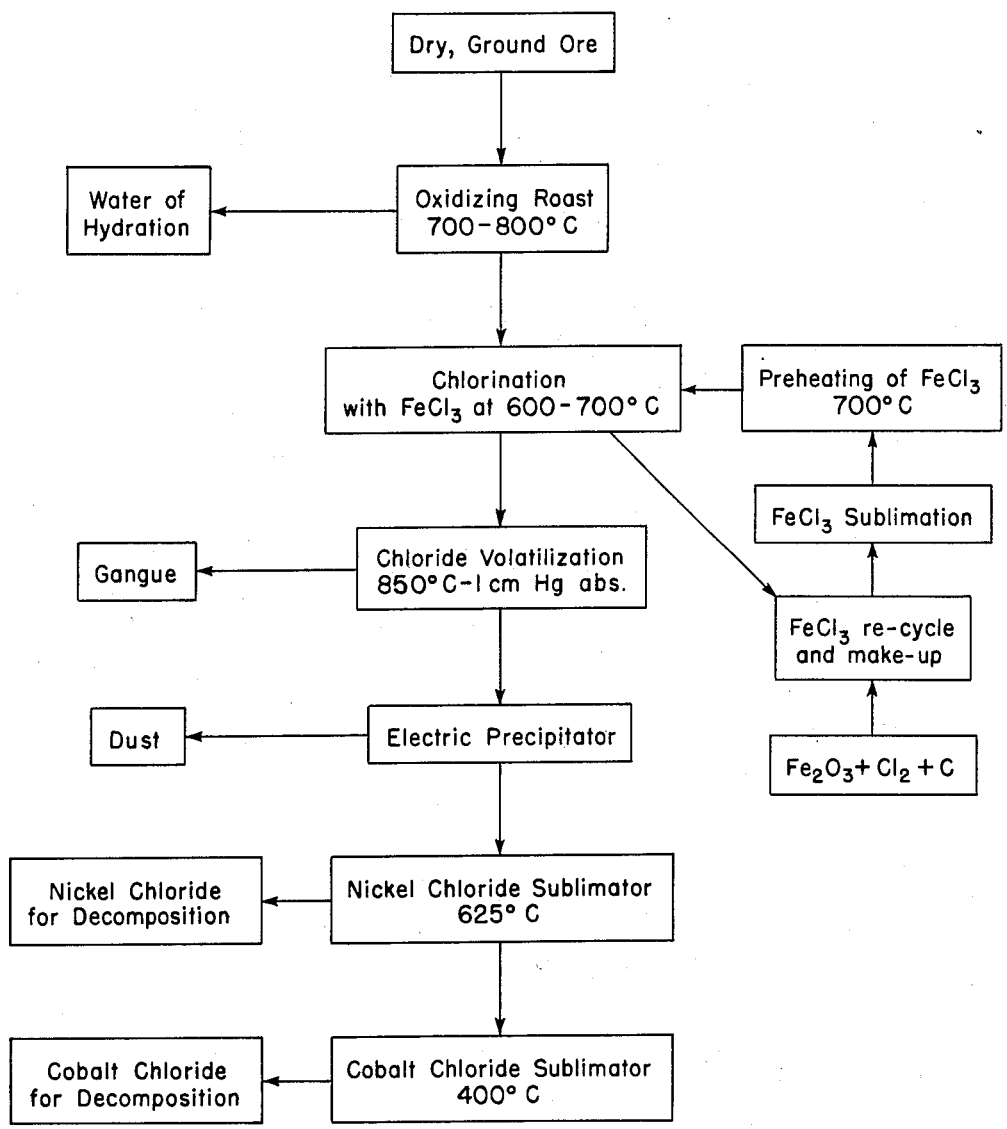
INVENTOR
John M. Daubenspeck
BY
Charles F. Kaegebahn
ATTORNEY

United States Patent Office 2,733,983
Patented Feb. 7, 1956

2,733,983

METHOD OF RECOVERING NICKEL AND COBALT FROM NICKELIFEROUS ORES

John M. Daubenspeck, Westfield, N. J., assignor to National Lead Company, New York, N. Y., a corporation of New Jersey Application December 7, 1953, Serial No. 396,688

5 Claims. (Cl. 23—183)

The present invention relates in general to the recovery of nickel and cobalt from nickeliferous ores containing cobalt, and in particular to the recovery of nickel and cobalt from low grade nickeliferous ores by a process which is both economically feasible and capable of performance profitably on a commercial scale.

The phrase "low grade nickeliferous ores" as used herein shall be understood to designate ores of the laterite and serpentine type, or mixtures thereof, containing not only nickel and cobalt but, in addition, iron, magnesium, silica, etc., wherein the percentage of nickel and/or cobalt is less than about 2% on a weight basis, typical deposits of such ores being found on the north coast of the island of Cuba and sometimes referred to in the art as Cuban ores. As suggested above, constituents other than cobalt and nickel occur in the ore and for the purposes of this description, these constituents, including the iron fraction, will be hereinafter referred to in general terms as the gangue fraction of the ore. These low grade nickeliferous ores are to be distinguished from high grade ores of the nature of garnierite, some of which contains as high as 6 to 6½% nickel. The recovery of nickel and cobalt from these relatively rich ores is accomplished comparatively easily, whereas the recovery of the nickel and cobalt values from low grade nickeliferous ores has heretofore been accomplished only with great difficulty and at great expense. Typical of these earlier efforts are the processes disclosed in the Caron Patents Nos. 1,487,145 and 2,290,313 whereby the ore is first reduced and then re-oxidized so as to convert substantially all of the soluble iron values to an insoluble form prior to an ammoniacal leaching step; or by converting a reduced or metallized nickel derived from the ore to a soluble form, such as nickel chloride, and thereafter leaching with water at about 85° C. to separate the soluble nickel chloride from the ferric chloride which is substantially insoluble at this temperature. Another experimenter has suggested the recovery of nickel values from nickeliferous ores by reducing the ore with a carbonaceous gas and sulfur dioxide and thereafter recovering the nickel as metal by chlorinating the reduced ore followed by roasting and leaching operations, the metal being recovered from the leach solution by electrolysis.

However, these earlier processes have been inefficient and relatively impracticable for commercial applications.

An object, therefore, of the instant invention is to provide an improved process for recovering nickel and cobalt values from low grade nickeliferous ores in an economical and commercially practicable manner.

A further object of the invention is to obtain relatively high recoveries of nickel and cobalt oxides from nickeliferous ores.

A still further object of the invention is to oxidize a nickeliferous ore and thereafter form and selectively separate nickel and cobalt chlorides from the gangue fraction in the ore; and subsequently convert the nickel and cobalt chlorides to nickel and cobalt oxides.

These and other objects, features and advantages of the invention are described in greater detail in the following description and claims of the invention.

In its broadest aspects, the instant invention relates to the recovery of nickel and cobalt from nickeliferous ores by an oxidation treatment followed by selective chlorination of the nickel and cobalt whereby the nickel and cobalt values are volatilized and separated from the gangue fraction and thereafter selectively converted to the oxides of nickel and cobalt. In particular, the process of the instant invention embodies the steps of dehydrating the ore, oxidizing the dehydrated ore, chloridizing the oxidized nickel and cobalt values in the ore while maintaining the oxidized gangue fraction substantially unchanged, volatilizing the nickel and cobalt chlorides, thereafter selectively separating the volatile nickel and cobalt chlorides by sublimation and then oxidizing the sublimated nickel chloride and cobalt chloride values to form the oxides of nickel and cobalt respectively.

An important feature of the invention and one which has insured the commercial feasibility of the process is the discovery of a relatively simple and inexpensive technique for separating the nickel and cobalt values from the gangue fraction in the ore. While previous efforts in this direction have been expensive and complex, the technique of the instant invention is characterized by the use of ferric chloride for chlorinating the dehydrated oxidized ore, as a consequence of which the gangue fraction in the ore, and in particular the iron which is in the form of ferric oxide, remains substantially unreacted, i. e. absorbs substantially no chlorine during treatment of the ore with the ferric chloride, whereas the nickel and cobalt values are chloridized to form nickel chloride and cobalt chloride, the reaction being carried out at relatively low temperatures such that the nickel and cobalt chlorides are not volatilized but remain as solid nickel chloride and cobalt chloride during chlorination of the ore. By this expedient the volatile ferric chloride used to chlorinate the nickel and cobalt values is not contaminated with volatile chlorides of nickel and cobalt, and consequently when discharged from the system at this stage of the process comprises, in large measure, volatile ferric chloride plus lesser amounts of free chlorine and hydrogen chloride. These volatile off-gases are recovered preferably by passing the volatile gases, including some free chlorine, over a tumbling bed of iron oxide containing a reducing agent such as, for example, a small amount of carbon. The volatile ferric chloride, in the presence of chlorine, will pass through the tumbling bed unchanged whereas any excess free chlorine and hydrogen chloride will be converted to additional ferric chloride which is recycled to the unreacted ore. By this expedient efficiencies of greater than 99%, based on chlorine loss, have been achieved.

The solid nickel chloride and cobalt chloride values in the ore are separated and removed from the gangue fraction in the ore by heating the chlorides to temperatures appreciably above those used for chlorinating the ore and under a partial vacuum such that the solid chlorides of nickel and cobalt are volatilized. In this connection the temperatures employed are in a rather limited temperature range of from 700 to 1000° C., the preferred temperature being about 850° C., the amount of vacuum being from about 0.1 to 5 centimeters of mercury and preferably about 1 centimeter of mercury.

Under these conditions the chlorides of nickel and cobalt are volatilized off from the ore body and are thereafter recovered by a selective sublimation procedure following which the chlorides are converted to the oxides of nickel and cobalt in the maner hereinafter described.

The description thus far pertains in particular to those steps of the process which keynote the basic concept of the invention and which in conjunction with the procedures illustrated in the accompanying flow sheet and described below insure the commercial success of the process.

As pointed out at the outset, the nickeliferous ore used is one having a relatively low percentage of nickel and cobalt, as for example less than about 2% whereas the total iron in the ore, in the form of hydrated ferric oxide, may be as high as about 45%. Prior to treatment, the dry ore is preferably crushed and ground to a particle size within the range of from 50 to 325 mesh and is thereafter given an initial dehydrating oxidation roast by passing the ore into suitable heating means, as for example a direct fired rotary kiln at a temperature within the range of about 700–800° C. and in a stream of air for a period of time sufficient both to oxidize and to effectively remove the water of hydration from the ore. By the expedient of dehydrating the ore, the ferric chloride which would otherwise combine with the water of hydration of the ore to form ferric oxide and hydrogen chloride and hence be consumed in large quantities is effectively conserved.

Although for practical reasons it is preferred to carry out the dehydration and oxidation of the ore in one step, it will be understood that oxidation of the ore may be carried out independently of the dehydration step by passing a stream of air over the dehydrated ore at about 700° C.

Following the initial oxidation and dehydration treatment of the ore, the ore is transferred to a chlorinating zone which is preferably separated from the oxidation-dehydration kiln by a vapor lock or equivalent device. In this latter zone, which may comprise a second rotary kiln, the preheated oxidized and dehydrated ore is subjected to the action of a chlorinating agent which in this instance is a gaseous ferric chloride, for chlorinating any nickel and cobalt values in the ore. The amount of ferric chloride used materially affects the degree of chlorination of the nickel and cobalt values, and while it has been observed that only stoichiometric quantities of ferric chloride are actually consumed during reaction with the ore, conversion of the nickel and cobalt values to the respective chlorides is achieved in a commercially satisfactory manner when many times the stoichiometric amount of ferric chloride is present during the reaction. Specifically, by providing a concentration of ferric chloride as high as from 10 to 40 times the stoichiometric amount required, conversions of the nickel and cobalt values to the respective chlorides have been as high as from 60% to 95%, the preferred concentration of ferric chloride being from about 35–40 times the stoichiometric amount required for insuring satisfactory operating efficiencies. It will be understood that the large excess of ferric chloride is not used during the reaction but merely serves to provide an atmosphere of highly concentrated ferric chloride in the reaction zone throughout the chlorination treatment. In this connection it has been found that where there is a tendency for ferrous chloride to form and ring the inside of the rotary kiln, this may be prevented by adding a small quantity of chlorine gas (substantially 6% of the ferric chloride by weight) to the charge during the reaction. Although the use of a rotary kiln for chlorinating the oxidized ore is satisfactory, it will be understood that it is within the purview of the invention to use other well known expedients in the art for intimately contacting the ore and chlorinating agent.

As brought out above, the instant process is characterized by chlorination of the nickel and cobalt chlorides without chlorination of the gangue fraction, and to this end the temperatures employed during chlorination are in the range of from 600 to 700° C. Within this temperature range, the gangue fraction, and in particular the iron in the ore, which is in the form of ferric oxide, remains unchanged whereas the nickel and cobalt values are converted to the solid chlorides of nickel and cobalt.

The ferric chloride gases together with any free chlorine and hydrogen chloride is conducted out of the reaction zone to a suitable scrubber, as mentioned above, by which the off-gases are converted to ferric chloride and recycled, thereby insuring high efficiencies in the use of ferric chloride.

The next step in the process is that of recovering the solid chlorides of nickel and cobalt, and to this end these materials are transferred to a third reaction zone which again may comprise a rotary kiln separated from the previous kiln by a vapor lock. The reactions in the third reaction zone are carried out at a pressure less than atmospheric, as for example in the range of from 0.1 to 5 centimeters of mercury whereby the solid chlorides of nickel and cobalt are not only volatilized at lower temperatures, thereby permitting the use of relatively inexpensive materials of construction, but their respective volatilization temperatures are separated by an appreciably wider temperature range, whereby substantially complete separation of the two volatile chlorides is assured.

For volatilizing the solid chlorides of nickel and cobalt, the temperature in the third reaction zone is preferably maintained in the range of from about 700 to 1000° C. and preferably at about 850° C. so that no additional heat need be added during the subsequent selective separation steps. At this temperature the solid chlorides are simultaneously volatilized whereupon they are passed through a suitable cleaning device, such as, for example, an electric precipitator or the equivalent which removes dust and similar impurities therefrom. The cleansed volatile chlorides are then selectively separated by passing the hot gases into a fourth zone, which may be a continuation of the third zone, and like the third zone is under reduced pressure, that is to say under a vacuum of about 1 centimeter of mercury. In this zone are arranged a series of continuous condensing surfaces over which the gases are passed, the temperatures of the successive condensing surfaces being such that the chlorides of nickel and cobalt are selectively sublimated and deposited thereon as solid crystals of nickel chloride and cobalt chloride respectively. As a precaution against loss of the nickel and cobalt chlorides by reoxidation, a small amount of ferric chloride may be bled into the sublimation chamber to maintain an atmosphere of ferric chloride therein.

By way of example, one form of apparatus which is suitable for the purpose of sublimating the respective chlorides is a set of rotating drums, each drum being maintained at a predetermined temperature which is below the sublimation temperature of the respective chlorides, the temperature of the drum for subliming the nickel chloride being about 625° C. and that for the cobalt chloride being about 400° C. The cooled drums are equipped with doctor blades so that by constantly rotating the drums the deposits of nickel chloride and cobalt chloride are constantly being removed and carried away by means of separate chutes or conveyors for subsequent treatment.

Conversion of the respective crystallized chlorides of nickel and cobalt to the corresponding oxides may be accomplished by forming beds of the crystallized nickel chloride, and crystallized cobalt chloride respectively, and passing oxygen, oxygen enriched air, or air under pressure over or through the beds while heating the beds to a temperature and for a period of time sufficient to convert the chlorides to the oxides of the respective metals.

Alternatively the nickel and cobalt values may be recovered from the crystallized chlorides in the form of metal by reducing the chlorides with hydrogen gas to form finely divided metal and hydrogen chloride; or by electrolysis of an aqueous solution of the respective chlorides to form and deposit the metal.

From the foregoing description it will be evident that the invention relates, in particular, to the recovery of nickel and cobalt values from a low grade nickeliferous ore by a process characterized by oxidation of the ore and subsequent chlorination of the nickel and cobalt values, followed by volatilization of the nickel and cobalt chlorides to effectively separate these values from the gangue fraction in the ore, and then selective sublimation of the nickel and cobalt chlorides to separate the two chlorides, each of which may then be converted to its respective metal oxide or metal by chlorination or electrolysis techniques respectively.

While this invention has been described and illustrated by the examples shown, it is not intended to be strictly limited thereto, and other variations and modifications may be employed within the scope of the following claims.

I claim:

1. A process for recovering nickel and cobalt values from nickeliferous laterite and altered serpentine ore containing cobalt and a gangue fraction comprising the steps of: oxidizing the nickeliferous ore including the nickel and cobalt values and the gangue fraction, chlorinating the oxidized nickel and cobalt values with gaseous ferric chloride at a temperature of from about 600° C. to about 700° C. to effect substantially complete conversion of the nickel and cobalt values to solid nickel chloride and solid cobalt chloride respectively and substantially no alteration of the oxidized gangue fraction, thereafter heating the solid nickel chloride and solid cobalt chloride under conditions of temperature and pressure such as to volatilize and separate the nickel and cobalt chlorides from the gangue fraction and then sublimating the volatile chlorides of nickel and cobalt under conditions of temperature and pressure such as to selectively form and precipitate solid nickel chloride and solid cobalt chloride substantially free of the gangue fraction.

2. A process for recovering nickel and cobalt values from nickeliferous ores containing iron and cobalt comprising the steps of: oxidizing the nickeliferous ore including the nickel and cobalt values under conditions favorable for the removal of substantially all the water of hydration from the ore and conversion of substantially all of the iron fraction to ferric oxide, chlorinating the oxidized nickel and cobalt values with gaseous ferric chloride at a temperature of from about 600° C. to about 700° C. to effect substantially complete conversion of the nickel and cobalt oxides to solid nickel chloride and solid cobalt chloride respectively and substantially no alteration of the ferric oxide fraction, thereafter heating the solid nickel chloride and solid cobalt chloride under conditions of temperature and pressure such as to volatilize and separate the nickel and cobalt chlorides from the iron fraction, sublimating the volatile chlorides of nickel and cobalt by selectively cooling the chlorides under sub-atmospheric pressures and at temperatures such as to form and selectively precipitate solid nickel chloride and solid cobalt chloride substantially free of iron oxide, and then reducing said nickel and cobalt chlorides to form nickel and cobalt metal.

3. A process for recovering nickel and cobalt values from nickeliferous ores containing cobalt and a gangue fraction comprising the steps of: heating the ore under conditions favorable for the removal of substantially all of the water of hydration from the ore, oxidizing the dehydrated ore including the nickel and cobalt values and the gangue fraction, chlorinating the oxidized nickel and cobalt values by passing volatile ferric chloride over said oxidized ore at a temperature of from about 600° C. to about 700° C. for effecting substantially complete conversion of the nickel and cobalt values to solid nickel chloride and solid cobalt chloride with substantially no alteration of the gangue fraction, thereafter heating the solid nickel chloride and solid cobalt chloride at a temperature of from about 700° C. to about 1000° C. and at sub-atmospheric pressure such as to volatilize and separate the respective chlorides from the gangue fraction, sublimating the volatile nickel chloride and cobalt chloride by selectively cooling the chlorides under sub-atmospheric pressures such as to form and selectively precipitate solid nickel chloride and solid cobalt chloride substantially free of iron oxide, and then oxidizing the respective solid chlorides of nickel and cobalt to form nickel oxide and cobalt oxide.

4. A process for recovering nickel and cobalt values from nickeliferous ores containing cobalt and a gangue fraction including magnesium and iron comprising the steps of: heating the ore under conditions favorable for the removal of substantially all of the water of hydration from the ore, oxidizing the dehydrated ore including the nickel and cobalt values and the gangue fraction, chlorinating the oxidized nickel and cobalt values by passing volatile ferric chloride and chlorine over said oxidized ore at a temperature in the range of from about 600° C. to about 700° C. for effecting substantially complete conversion of the nickel and cobalt values to solid nickel chloride and solid cobalt chloride with substantially no alteration of the gangue fraction, thereafter heating the solid nickel chloride and solid cobalt chloride at a temperature in the range of from 700° C. to about 1000° C. and at a sub-atmospheric pressure in the range of from about 0.1 to 5 centimeters mercury, to volatilize and separate the respective chlorides from the gangue fraction, sublimating the volatile nickel chloride and cobalt chloride by cooling the chlorides under sub-atmospheric pressures in the range of from about 0.1 to 5 centimeters mercury and at successively lower temperatures to form and selectively precipitate solid nickel chloride and solid cobalt chloride substantially free of iron and magnesium oxides, and then oxidizing the respective solid chlorides of nickel and cobalt to form nickel oxide and cobalt oxide.

5. A process for recovering nickel and cobalt values from nickeliferous ores containing iron, magnesium and cobalt comprising the steps of: heating the ore under conditions favorable for the removal of substantially all of the water of hydration from the ore, oxidizing the dehydrated ore by treating the ore with an oxidizing agent at elevated temperatures, chlorinating the oxidized nickel and cobalt values by passing volatile ferric chloride and chlorine over said oxidized ore at a temperature of about 650° C. for effecting substantially complete conversion of the nickel and cobalt values to solid nickel chloride and solid cobalt chloride with substantially no alteration of the oxidized iron and magnesium fraction, recovering and recirculating the residual volatile ferric chloride and chlorine to the unreacted ore, thereafter heating the solid nickel chloride and solid cobalt chloride at a temperature of about 850° C. and at a sub-atmospheric pressure of about 1 centimeter of mercury, sublimating the volatile nickel chloride and cobalt chloride by cooling the chlorides under a sub-atmospheric pressure of about 1 centimeter of mercury to temperatures of about 650° C. and about 400° C. successively to form and selectively precipitate solid nickel chloride and solid nickel chloride substantially free of the oxides of iron and magnesium, and then oxidizing the respective solid chlorides of nickel and cobalt to form nickel oxide and cobalt oxide.

References Cited in the file of this patent

UNITED STATES PATENTS

| 466,495 | Herrenschmidt | Jan. 5, 1892 |
| 940,292 | Wells | Nov. 16, 1909 |
| 1,933,702 | Brown | Nov. 7, 1933 |
| 2,036,664 | Wescott | Apr. 7, 1936 |
| 2,341,873 | Kissock | Feb. 15, 1944 |

FOREIGN PATENTS

| 7,585 | Great Britain | 1891 |